Sept. 29, 1942.     O. F. BAUER     2,296,894
APPARATUS FOR TESTING GEARS
Filed April 19, 1941     4 Sheets-Sheet 2

Inventor
OLIVER F. BAUER
By
Attorney

Sept. 29, 1942.　　　O. F. BAUER　　　2,296,894
APPARATUS FOR TESTING GEARS
Filed April 19, 1941　　　4 Sheets-Sheet 4

Inventor
OLIVER F. BAUER
By B. E. Schlesinger
Attorney

Patented Sept. 29, 1942

2,296,894

UNITED STATES PATENT OFFICE 2,296,894

APPARATUS FOR TESTING GEARS

Oliver F. Bauer, East Rochester, N. Y., assignor to Gleason Works, Rochester, N. Y., a corporation of New York Application April 19, 1941, Serial No. 389,426

6 Claims. (Cl. 33—179.5)

The present invention relates to apparatus for testing gears and specifically to apparatus for testing gears in a running test.

One object of the invention is to provide apparatus for testing gears in a running test which will permit of testing the gears not only for silence and for tooth bearing, but also for any irregularities or imperfections that may occur in manufacture.

A still further object of the invention is to provide testing apparatus of this character on which gears of a wide variety of sizes may be tested, and which may be employed for the testing not only of bevel gears but also spur gears.

Other objects of the invention will be apparent hereinafter from the specification and from the recital of the appended claims.

In the testing apparatus of the present invention, the pair of gears to be tested are mounted on separate arbors or spindles for rotation together. The two arbors or spindles are carried by separate heads. One arbor or spindle is directly mounted in its head, but the other arbor or spindle is mounted in a carrier, which in turn is pivotally mounted in the second head for swinging movement about an axis parallel to the axis of the second arbor or spindle. In the preferred construction, each head is adjustable axially of the arbor or spindle carried thereby. In addition, one of the heads is mounted for adjustment in a direction at right angles to the axis of the arbor or spindle mounted in the head, while the other head is adjustable angularly about an axis at right angles to and intersecting the axes of the two arbors or spindles.

When testing bevel gears, the heads are adjusted so that the axes of the two arbors or spindles are inclined to each other at an angle corresponding to the angle between the axes of the gears to be tested. When testing spur gears, the heads are adjusted to bring the axes of the two arbors or spindles into parallelism.

For testing the gears for inaccuracies, the two gears being tested are held resiliently in mesh by a spring load applied to the pivoted carrier, and means is provided for measuring the amount of movement of the carrier as the two gears rotate together. The amount of movement of the carrier is a measure of the inaccuracy of the gears. For exerting spring pressure on the carrier to apply loads on the gears, two oppositely acting springs are provided. One spring acts to constrain the carrier to move in one direction about the pivot. The other spring acts to constrain the carrier to move in the opposite direction about its pivot.

One spring is more powerful than the other and its tension can be adjusted to be either greater than or less than the tension of the other, depending on the direction in which it is required to move the carrier to hold the gears being tested resiliently in mesh under load.

Means is also provided for locking the carrier against pivotal movement so that the gears may be tested in fixed position for silence and for position of tooth bearing.

Figure 1:
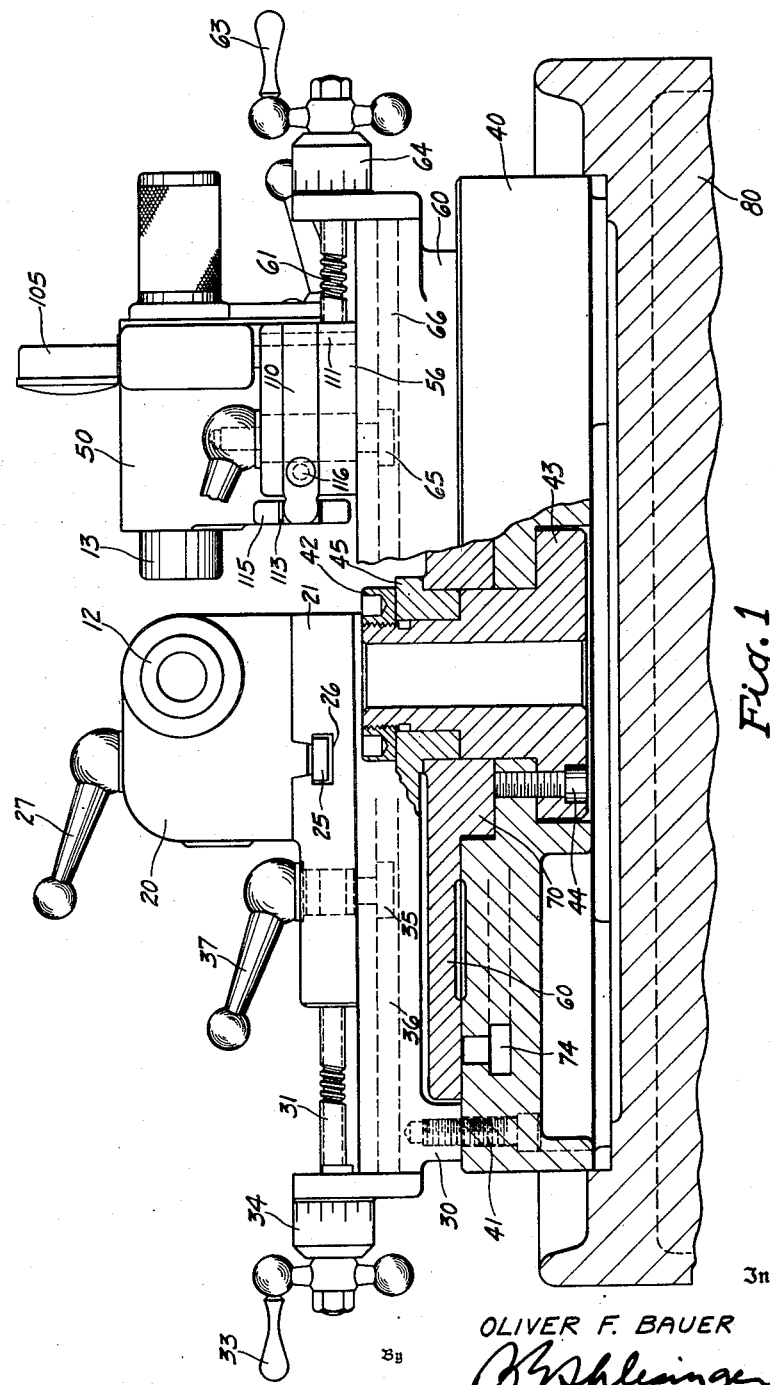
Fig. 1 is a part sectional, part elevational view of a testing apparatus constructed according to one embodiment of this invention.

The machine illustrated in the drawings is of a size built for testing quite small gears, and instead of mounting the gears which are to be tested, on live spindles, which are driven to rotate the gears in mesh, the gears are mounted upon arbors for manual rotation. These arbors are denoted at 10 and 11, respectively, while the gears to be tested are denoted at G and G', respectively. The two arbors are secured in any usual or suitable manner in sleeves 12 and 13.

The sleeve 12 is mounted directly in a head 20. This head is mounted on a slide 21 for adjustment in the direction of the axis of the arbor 10. This adjustment may be effected by rotation of the screw shaft 22 which is journaled in the slide 21 and which threads into the head 20. A hand lever 23 is provided for effecting rotation of the shaft 22, and a graduated dial 24 is secured to the shaft to permit of this adjustment being made precisely. The head 20 is secured to the slide 21 in any adjusted position by means of a T-bolt whose head 25 engages in a T-slot 26 (Fig. 1) formed in the upper face of the slide 21. The T-bolt is manipulated by the hand lever 27.

The slide 21 is mounted on a plate 30 for linear adjustment in a direction at right angles to the direction of adjustment of the head. This adjustment is effected by rotation of the screw shaft 31 which is journaled in the plate 30 and which threads into the slide 21. The hand lever 33 is provided for rotating the screw shaft, and a graduated dial 34 is secured to the shaft to allow adjustment of the slide 21 to be made precisely.

The plate 30 is secured to the base 40 of the machine by screws 41 and by a nut 42 (Fig. 1). The nut 42 threads onto the upper end of a center 43 that is secured to the base 40 by screws 44. The nut engages over the extension 45 of the plate 30. This extension is bored to receive the center 43.

Figure 4:
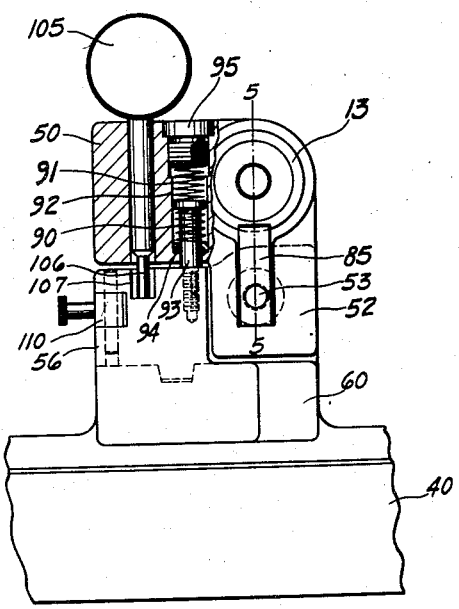
Fig. 4 is a rear end view, with parts broken away, of said carrier and head, and further showing the mounting of the head.
Figure 5:
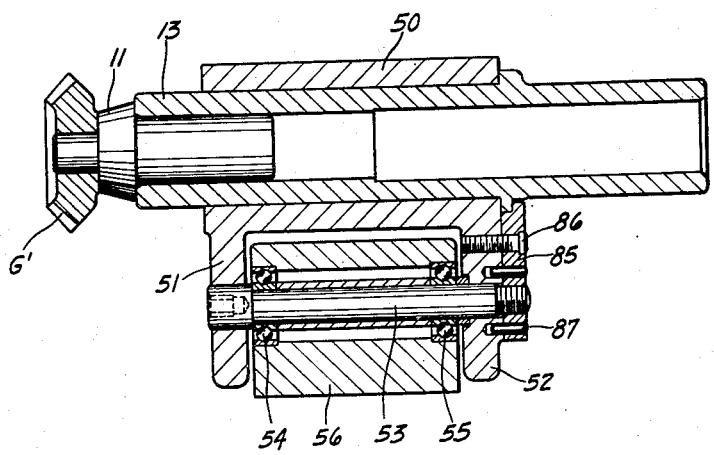
Fig. 5 is a sectional view on a somewhat enlarged scale on the line 5—5 of Fig. 4.

The sleeve 13 is mounted in the pivoted carrier 50 which is of general right angular shape in cross section, as illustrated clearly in Fig. 4. The carrier is formed with ears 51 and 52 (Fig. 5) which carry a stud 53 that is journaled by means of anti-friction bearings 54 and 55 in a head 56.

The head 56 is mounted on a swivel plate 60 for adjustment in the direction of the axis of the arbor 11 which is mounted in the sleeve 13. This adjustment is effected by rotation of the screw shaft 61 which is journaled in the swivel plate 60 and which threads into the head 56. A hand lever 63 is provided for rotating the screw shaft 61 and a graduated dial 64, which is secured to the screw shaft, enables the adjustment of the head 56 to be effected precisely. The head 56 is secured to the swivel plate 60 in any adjusted position by means of a T-bolt 65 which engages in a T-slot 66 formed in the upper face of the swivel plate 60.

The swivel plate 60 is circular in shape and is mounted for angular adjustment on the base 40. It is formed with a central trunnion portion 70 which takes its bearing on the center 43. The angular adjustment of the swivel plate on the base is effected manually, and for the purpose of making it precisely, a vernier 71 is secured to the swivel plate and the upper face of the base 40 is graduated as clearly shown in Fig. 2. The swivel plate 60 is adjustable through an angle of 120° or more and may be secured in any adjusted position by means of T-bolts whose heads engage in the circular T-slot 74 formed in the upper face of the base 40. The T-bolts are manipulated by means of the hand levers 75. The base may be placed on a bench or it may be mounted upon a suitable pedestal such as shown at 80.

As already stated, the carrier 50 for the sleeve 13 and arbor 11 is pivotally mounted by means of the pin 53 in the head 56. This pin is secured to the carrier 51 by means of a plate 85 into which the pin threads at one end. The plate 85 is secured to the ear 52 of the carrier 51 by the screw 86 and the dowels 87. This plate 85 also serves to hold the sleeve 13 against axial movement in the carrier.

By adjustment of the swivel plate 60 on the base 40, the arbor 11 can be set at any angle with reference to the axis of the arbor 10 for testing either bevel or spur gears. The adjustments of the head 20 on the slide 21 and of the head 56 on the swivel plate 60 permit of accommodating bevel gears of any given cone distance within the range of the apparatus. The adjustment of the slide 21 on the plate 30 serves to permit of accommodating for test spur gears of any diameter within the range of the apparatus.

For testing the gears for accuracy, they are meshed under load. For this purpose, two coil springs 90 and 91 (Fig. 4) are provided. The two coil springs are mounted in a hole 92 drilled in the carrier 50. The coil spring 90 is interposed between the head of a pin 93 and a washer 94 that is seated in the bottom of the hole 92. The pin 93 is fixedly threaded into the head 56. The coil spring 91 seats against the upper face of the head of the pin 93 and is interposed between that face and an adjusting screw 95 which threads into the upper end of the hole 92.

The spring 91 is heavier than the spring 90 and can be adjusted by adjusting screw 95. If the tension of the spring 91 is adjusted so that it is greater than that of the spring 90, then the spring 91 operating on the head of the pin 93 will tend to move the carrier 52 in a clockwise direction about its pivot 53, as viewed in Fig. 4. If the tension of the spring 91 is adjusted so that it is less than the tension of the spring 90, then the spring 90 will tend to move the carrier 50 in a counter-clockwise direction about the pivot 53, as viewed in Fig. 4.

Figure 6:
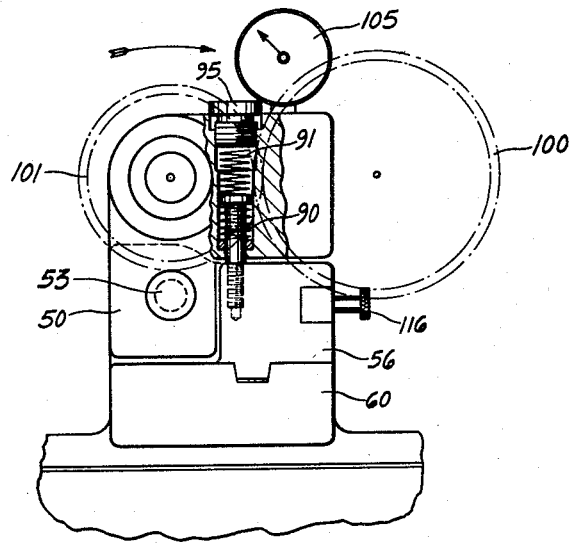
Fig. 6 is a diagrammatic view illustrating how the load may be applied when testing a pair of spur gears for accuracy.

When testing spur gears, such as denoted at 100 and 101 in Fig. 6, the swivel plate 60 will be adjusted angularly on the base 40 so that the axes of the two gear carrying arbors 10 and 11 will be parallel to one another. If the head 20 remains to the left of the head 56, as viewed in Fig. 2 and as shown in Fig. 6, then the tension of the spring 91 will be adjusted to make it less than the tension of the spring 90. The spring 90 will then be effective to move the carrier 50 clockwise about the pivot 53, as viewed in Fig. 6, to resiliently hold the spur gears 100 and 101, which are being tested, in mesh. Any inaccuracies or irregularities in the gears will cause the carrier 50 to be moved about its pivot 53 as the gears rotate together. A dial gage 105 of any suitable construction is mounted in the carrier 50 and has a plunger 106 (Fig. 4) which engages in the bottom of the recess 107 formed in the head 56. This gage 105 serves to indicate any movement of the carrier 50, thereby permitting the operator of the apparatus to ascertain any inaccuracies or irregularities in the gears being tested.

Figure 2:
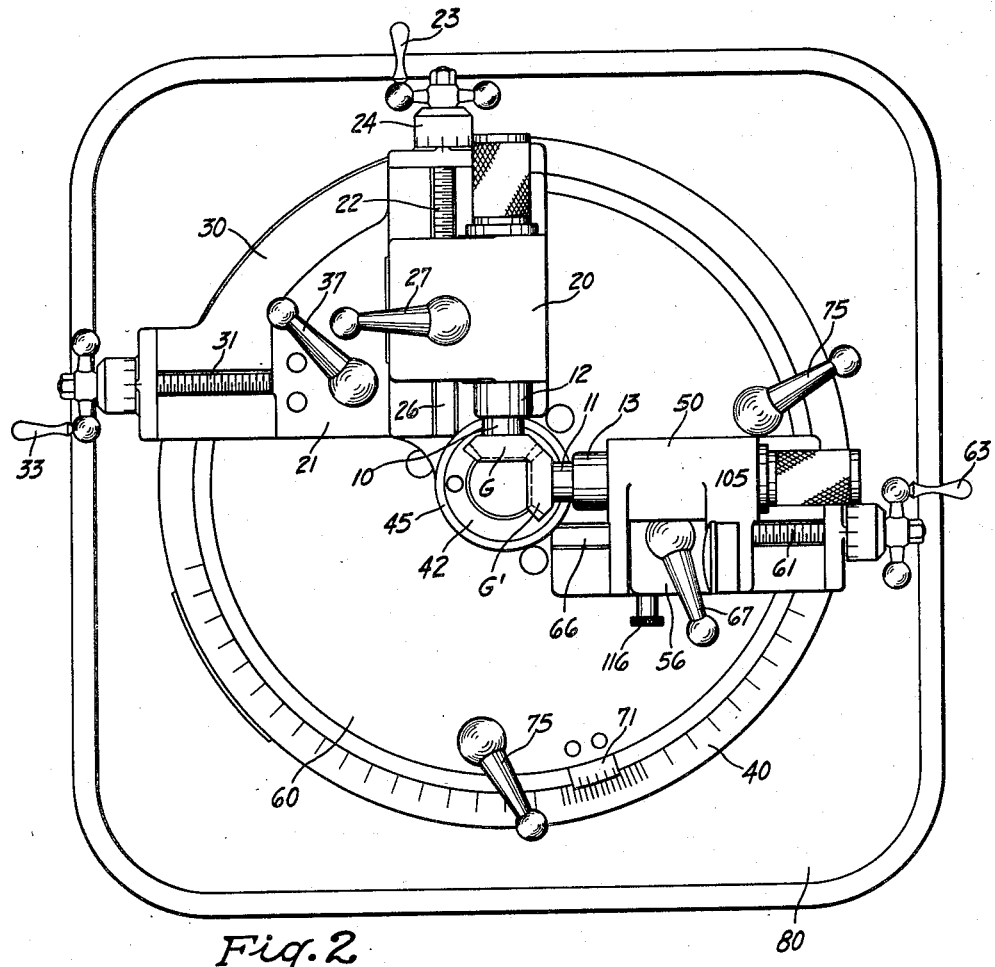
Fig. 2 is a plan view of the testing apparatus.
Figure 3:
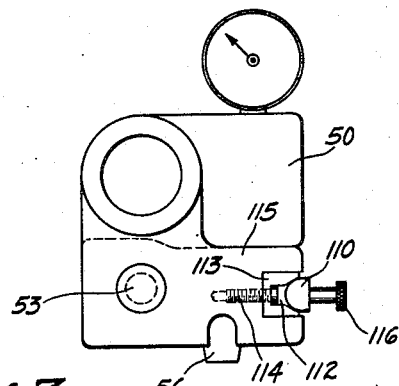
Fig. 3 is a front end elevation of the pivoted carrier and of the head on which it is mounted.
Figure 7:
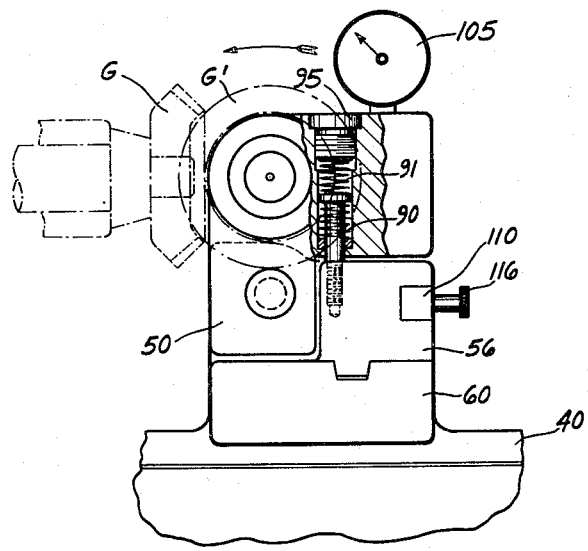
Fig. 7 is a diagrammatic view illustrating how the load may be applied when testing a pair of bevel gears for accuracy.

When a pair of bevel gears G and G' are being tested, the swivel plate 60 will be adjacent to a position such as shown in Fig. 2 and the tension of the spring 91 will be adjusted to be greater than that of the spring 90 with the result that the spring 91 will tend to move the carrier 50 counter-clockwise about its pivot 53, as viewed in Fig. 7, to hold the gears resiliently in mesh. Again any irregularities in the gears will tend to move the carrier 50 about its pivot against the resistance of the spring 91 as the gears are rotated together. Such movement is measured by the gage 105. For testing the running qualities of the gears as regards noise, and for determining the position of tooth bearing, the gears are rotated together on fixed axes. For this purpose, the carrier 50 is locked against movement. To lock the carrier, a lever 110 is provided. This lever is pivotally mounted in the head 56 by means of a pin 111 (Fig. 1). It is formed with a semi-round portion at its front end, as illustrated in Fig. 3. This semi-round portion is adapted to seat in a generally V-shaped groove 112 formed in a hardened plate 113. This plate is secured by means of a screw 114 in a recess in the extension 115 of the ear 51 of the carrier 50. A knob 116 is provided on the lever 110 to permit swinging the lever about its pivot pin 111. When the semi-round portion 110 is disengaged from the plate 113, the carrier 50 is free to move about its pivot pin 53, but when the semi-round portion of the lever 110 is engaged with the hardened member 113, the carrier 50 is locked against movement about its pivot.

In the apparatus shown, one of the gears is simply rotated manually on its arbor by the operator in order to rotate the gears together. It will be obvious, however, that the machine can be built with live spindles and that one of these spindles can be driven by any suitable means to rotate the gears, which are to be tested, together in mesh.

It will be understood, moreover, that while the invention has been described in connection with a particular embodiment thereof, it is capable of further modification, and this application is intended to cover any variations, uses, or adaptations of the invention, following in general the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. Apparatus for testing a pair of tapered gears comprising a pair of supports for supporting the gears to be tested with their axes angularly disposed to one another, a carrier in which one of said supports is mounted, a head on which said carrier is mounted for pivotal movement about an axis parallel to the axis of rotation of one of the gears, a head on which the other support is mounted, means for adjusting the heads relative to one another to bring the gears carried by said supports into mesh, separate means for yieldably urging the carrier in opposite directions, respectively, about its pivot to hold said gears in mesh under load, means for adjusting the tension of one of said yieldable means to render it operative or inoperative at will, and means for indicating the amount of any movement of the carrier about its pivot as the gears rotate together.

2. Apparatus for testing a pair of spur gears comprising a pair of supports for supporting the gears to be tested with their axes parallel to one another, a carrier in which one of said supports is mounted, a head on which said carrier is mounted for pivotal movement about an axis parallel to the axis of rotation of one of the gears, a second head on which the other support is mounted, means for adjusting the heads relative to one another to bring the gears carried by the supports into mesh, separate means for yieldably urging the carrier in opposite directions, respectively, about its pivot to hold the gears in mesh under load, means for adjusting the tension of one of the yieldable means to render it operative or inoperative at will, and means for indicating the amount of any movement of the carrier about its pivot as the gears rotate together.

3. Apparatus for testing gears comprising a pair of supports on which the gears that are to be tested are mounted for rotation, a carrier for one of said supports, a head in which said carrier is mounted for pivotal movement about an axis parallel to the axis of rotation of the gear which is mounted on said carrier, a second head in which the other support is mounted, one of said heads being adjustable relative to the other about an axis intersecting the axes of said supports, separate means for yieldably urging said carrier in opposite directions, respectively, about its pivot to hold the gears in mesh under load, means for adjusting the tension of one of said yieldable means, and means for indicating the amount of any pivotal movement of said carrier as the gears are rotated in mesh.

4. Apparatus for testing gears comprising a pair of supports on which the gears that are to be tested are mounted for rotation together, a carrier for one of said supports, a head on which said carrier is pivotally mounted for movement about an axis parallel to the axis of the gear mounted on said support, a second head on which the other support is mounted, means for adjusting the heads relative to one another to bring the gears carried by the supports into mesh, means for yieldably urging the carrier in one direction about its pivot, means for yieldably urging the carrier in the opposite direction about its pivot, means for adjusting the tension of one of said yieldable means, and means for indicating the amount of any pivotal movement of said carrier as the gears are rotated together in mesh.

5. Apparatus for testing gears comprising a pair of supports on which the gears that are to be tested are mounted for rotation together, a carrier for one of said supports a head on which said carrier is pivotally mounted for movement about an axis parallel to the axis of the gear mounted on said support, a second head on which the other support is mounted, means for adjusting the heads relative to one another to bring the gears carried by said supports into mesh, means for yieldably urging the carrier in one direction about its pivot, means for yieldably urging the carrier in the opposite direction about its pivot, the tension of one of said yieldable means being fixed, means for adjusting the tension of the other yieldable means, and means for indicating the amount of any pivotal movement of said carrier as the gears are rotated together in mesh.

6. Apparatus for testing gears comprising a frame, a swivel member angularly adjustable on the frame, a slide linearly adjustable on the frame, a head mounted on the swivel member for adjustment radially of the axis of said swivel member, a second head adjustable on the slide for adjustment in a direction at right angles to the adjustment of said slide, a carrier pivotally mounted on the first head for angular movement about an axis extending in the direction of adjustment of said first head, a support mounted on said carrier for supporting one of the gears to be tested for rotation about an axis parallel to the axis of pivotal movement of the carrier, a support for the other gear to be tested mounted in the second head for rotation on an axis extending in the direction of adjustment of said second head, separate means for yieldably urging the carrier in opposite directions, respectively, about its pivot, means for adjusting the tension of one of said yieldable means, and means for indicating the amount of any pivotal movement of the carrier as the gears, which are mounted on said supports, rotate together in mesh.

OLIVER F. BAUER.